Jan. 12, 1971  J. R. VYCE  3,554,650
FOCUS SENSOR

Filed Jan. 2, 1968  5 Sheets-Sheet 1

INVENTOR.
JOSEPH R. VYCE
BY Robert L. Mattern
ATTORNEYS

INVENTOR.
JOSEPH R. VYCE
ATTORNEYS

INVENTOR.
JOSEPH R. VYCE
BY
Robert L. Nathans
ATTORNEYS

United States Patent Office 3,554,650
Patented Jan. 12, 1971

3,554,650
FOCUS SENSOR
Joseph R. Vyce, Lexington, Mass., assignor to Itek Corporation, Lexington, Mass., a corporation of Delaware
Filed Jan. 2, 1968, Ser. No. 695,242
Int. Cl. G01d 1/00, 11/26
U.S. Cl. 356—121                          14 Claims

ABSTRACT OF THE DISCLOSURE

An electro-optical, autocollimated focus sensor for an optical system. The focus sensor consists of a small sensor head in the focal plane outside the desired image area, and a retroreflective set of two diametrically opposed small penta reflectors on the object side of the lens. A light beam from a small illuminated slit in the sensor head is alternately directed at each penta, collimated by the lens, reflected across the optical system aperture by the corresponding penta reflector, and reflected by the other penta back into the optical system to form an autocollimated slit image. The alternating slit images are precisely superimposed on the slit when the optical system is in focus, but separate laterally with defocus. Two light detectors are arranged to detect light falling on either side of the slit, and each puts out a signal indicative thereof. One signal is compared with the second signal to form a comparison signal, and the amplitude and phase of the comparison signal indicate the magnitude and direction of focus.

---

Figure 1:
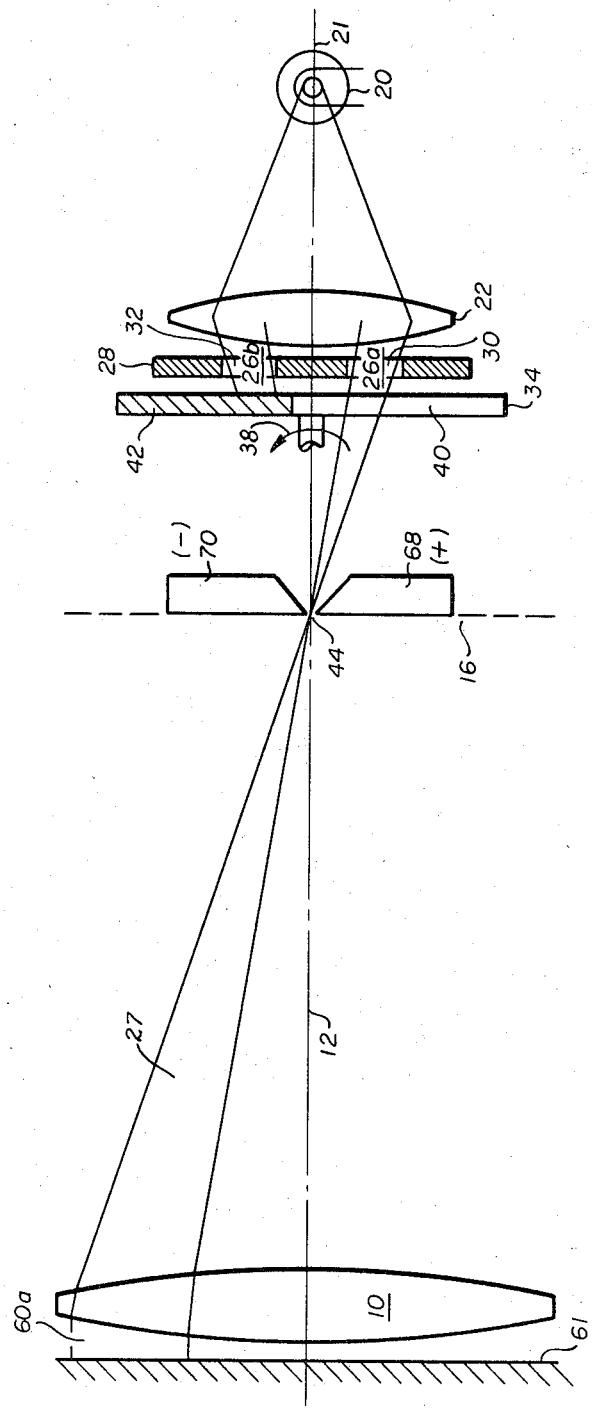

This invention relates to a focus sensor, and in particular, to an apparatus for establishing precise axial coincidence between a movable object and its image, as autocollimated through an objective lens, thereby to determine at their coincidence, one point in the plane of best focus of the lens.

Fast, large aperture, high resolution lenses are characterized by an extremely limited range over which good imagery is maintained. Any real lens does not form a perfect point image from a planewave, but instead has a minimum sized blur circle in a small region about the point of best focus. A diffraction limited lens has a blur circle which may be considered to be the Airy disk of the diffraction pattern corresponding to the lens aperture.

The depth of focus defines the range of focus over which the image quality does not degrade beyond a specified limit. The depth of focus may be specified for a diffraction limited lens, as the range of image plane position along the optical axis within which the computed blur due to defocusing is not greater than the Airy disk diameter. Using this criterion, the depth of focus for a diffraction limited lens is given as $g(f/D)^2$ or $g(f/No.)^2$, where $g$ is the average wavelength of the photographic light approximately of value of 20 microinches, $f$ is the focal length of the lens, $D$ is the diameter of the lens and $(f/No.)$ is the relative aperture of the lens. This says that the depth of focus is the same for all lenses of the same lens aperture. In an $f/1$ lens the magnitude of the depth of focus is 20 microinches; the magnitude is 80 microinches for an $f/2$ lens and 180 microinches for an $f/3$ lens.

Some of the causes of defocusing are: changes in optical path lengths due to temperature, pressure or altitude-induced variation in the refractive index of air, and changes in structural dimensions due to "g" load variations and focal shift due to altitude variation. These causes have a definitive specific value applicable to a lens for camera systems of any size. For example, a change in temperature of one degree centigrate causes most metals to undergo a length change of about one to two parts in one hundred thousand. An $f/3$ lens of 180-microinch depth of focus, suffering a change of 10 microinches in focal length, will excessively degrade the image on a film at the original imaging position.

Although small, fast, lenses such as microscope objectives have long been characterized by minute depth of focus, it is the combination of minute depth of focus in a long focal lens of large size which presents the new problem. It is manifestly difficult to maintain in focus, within 0.001 to 0.0001 inch a complex optomechanical system several feet long, in the presence of changes in temperature, "g" loading and air density. Sufficiently accurate devices are available to adjust the film location to well under 0.0001 inch. However, the key to focus control is the focus sensor. The focus sensor actually detects the magnitude and direction of the change in initial relationship between the plane of best focus, or focal plane, and the movable object plane, and provides output information to the servomechanism, which serves to move the film to the plane of best focus, or focal plane, or at least to a position of minimum defocus.

With an infinite wavefront, it can be shown that point images formed by rays from the edges of a lens are superimposed in the focal plane, but separate laterally with defocusing. If the bundles of rays emanate from diametrically opposed aperture, the separation is parallel to that diameter, and the direction of separation reverses with the direction of defocusing.

In accordance with the present invention, broadly speaking, a movable object source at a test object plane projects rays through the apertures of a lens system which collimates the rays and images the object in an imaging plane, which will generally be separated from the test object plane. The plane of best focus is intermediate to the imaging and test object planes. Then sensor senses the direction and degree of this separation, and causes the object source, and hence the test object plane, to be moved in the direction of the imaging plane, which in turn causes the imaging plane to move toward the test object plane. Ideally, this movement of the sensor ceases when the imaging and test object planes coincide at the plane of best focus.

Twin optical detectors straddle the object source, while a chopper and condenser lens combination provides for sequentially and cyclically illuminating the object source. The detectors with associated circuitry produce an AC difference signal whose amplitude is proportional to the degree of the aforesaid separation, and whose phase (0 or $\pi$ radians) is indicative of the direction of said separation, with respect to the test object plane. The difference signal may be applied in one form or another to a servo system which eliminates the aforesaid separation, by moving the object source into the focal plane at the null condition. Any unbalance in the response characteristics of the twin detectors is manifested as a signal which is the second harmonic of the carrier signal, whose frequency is determined by the angular velocity of the chapper, and is filtered out of the system. Since the aforesaid separation is generally very small, this aspect of my invention is quite important. Additionally, since scanning is effected by the movement of a chopper in a relatively uncritical portion of the optical system, rather than movement of the detectors, very accurate results are obtained. It may be noted that the coincidence of the focal surface and the object source at null is proximate. If the elements (e.g., the pentaprisms) of the autocollimating sensor system are perfect, the two coincide perfectly. However, this is not necessary in practice, and a proximate relationsip has been found to be quite satisfactory.

In a camera, other factors can determine which element will be moved to restore optimum image resolution, that is, whether the camera objective is to be moved, or the film platen. By appropriate movement of the lens alone, or of the film, or a combination of both, the system is restored to the in-focus position.

An object of this invention is to provide an improved focus sensor that senses the position of the plane of best focus of a given optical system.

Another object of this invention is to provide an improved focus sensor that provides continuous sensing without interference with the associated optical system.

A further object of this invention is to provide an improved focus sensor that provides an output signal usable directly by a focus restoring servomechanism.

It is yet a further object of this invention to provide an improved focus sensor that requires a minimum of moving parts and associated equipment.

A further object of this invention is to provide an improved focus sensor that has inherent directional sense and is stable.

A further object of the present invention is to provide a focus sensor which is not adversely affected by possible unbalance in the response characteristics of a pair of optical detectors utilized in the sensing process.

A further object of the present invention is to provide a focus sensor wherein periodic scanning oscillation of the optical detectors is avoided.

These and other objects are obtained in the present invention by providing an apparatus for sensing change in an initial relationship between an element of the focal surface of an optical system and a movable test object plane defined by the apparatus.

For a better understanding of the present invention, together with further objects, features and advantages thereof, reference is made to the following description taken in connection with the accompanying drawings. The scope will be pointed out in the appended claims.

Figure 2:
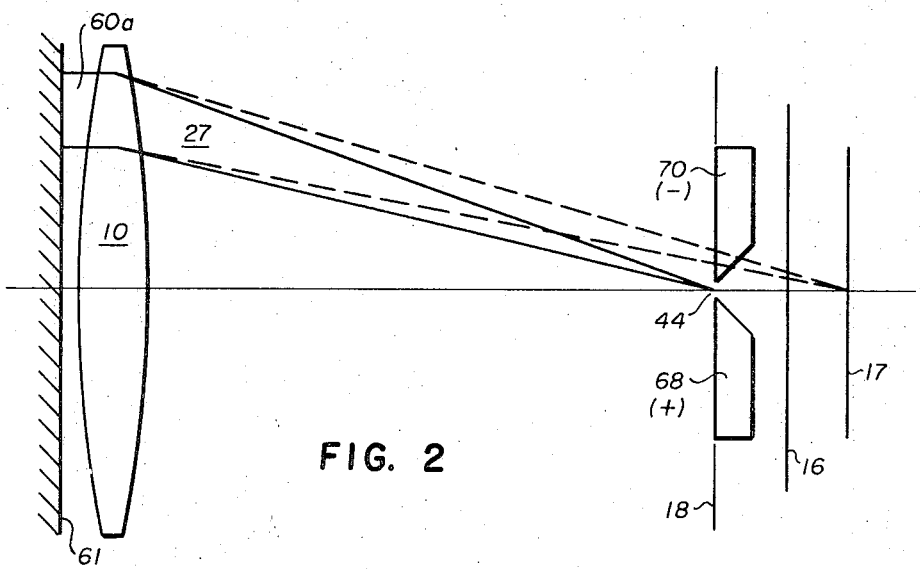
Figure 3:
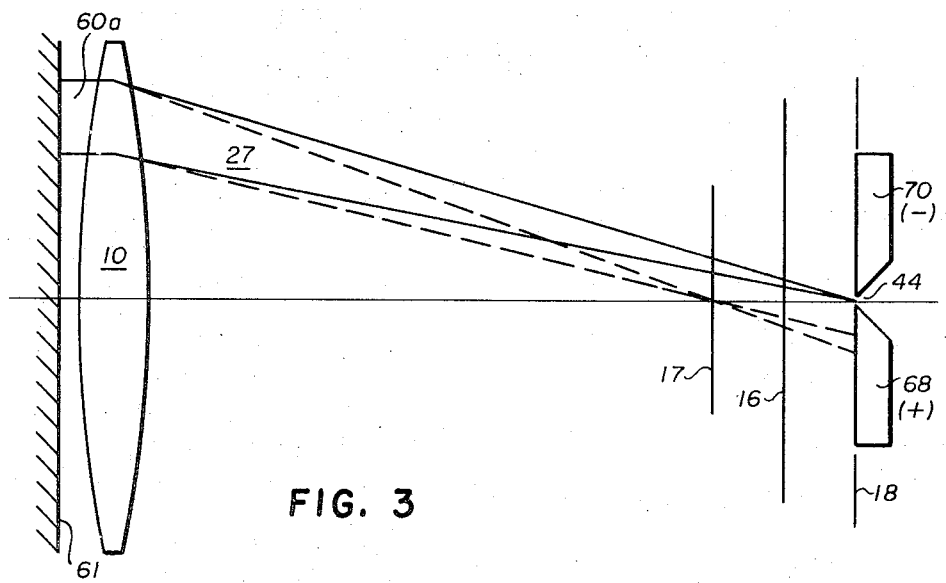
Figure 4:
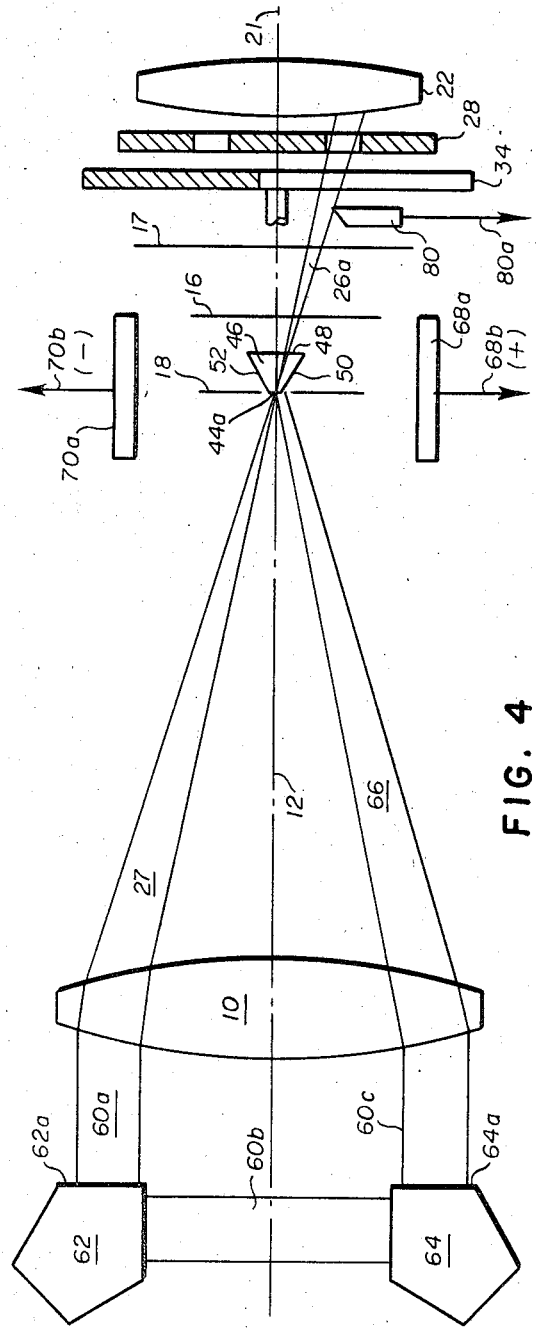
Figure 5:
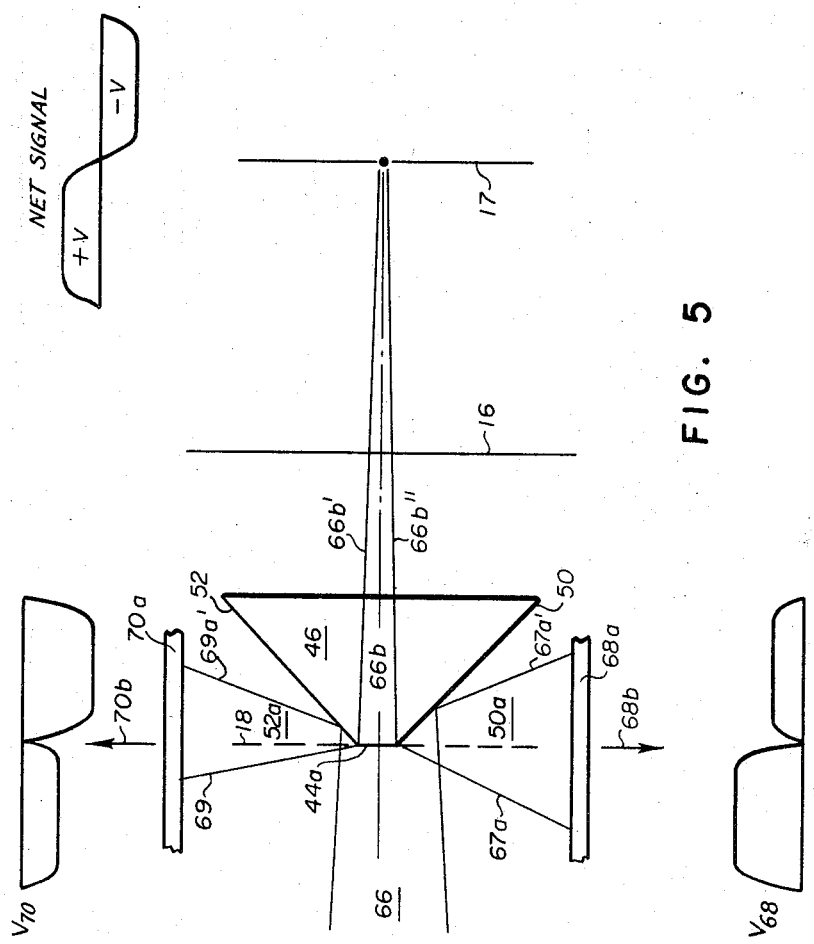

In the drawings, FIG. 1 discloses a first embodiment; FIGS. 2 and 3 disclose diagrams which will aid in the understanding of the first embodiment; FIG. 4 discloses a second embodiment; FIG. 5 discloses a diagram which will aid in the understanding of the second embodiment and FIG. 6 discloses a third embodiment.

With reference to FIG. 1, there is shown an apparatus disclosing the concepts of the present invention for sensing the separation of a focal surface or focal plane 16 of an optical system 10 from an adjacent test object plane. The test object plane will generally be located in a plane formed by an imaging surface, whereon it is desired for the optical system to produce a focused image. The imaging surface may be the surface of a film medium, or may be simply a plane wherein it is desired for the optical system to produce a focused image. In FIG. 1, the test object plane is superimposed in focal plane 16, for purposes of explanation to describe the null condition. For purposes of simplification, a base means is not shown; however, it will be understood that it defines a measuring axis 21. Measuring axis 21 intercepts a principal point of optical system 10 and intersects focal plane 16 and the test object plane. It will be obvious to one skilled in the optical arts, that measuring axis 21 may be disposed in the optical axis 12 of optical system 10 as in FIG. 1, or at an angle thereto, without departing from the concepts of the present invention.

Further comprising the apparatus, is an illuminated object source, disposed on measuring axis 21, at the test object plane, for projecting light along a path through optical system 10, which light is reflected from mirror 61 to form an autocollimated image in an imaging plane. The object source includes a condenser lens system 22, a light source 20 and a slit 44. Slit 44 has a width of the order of 0.001 inch. Condenser lens system 22 is idealized as a single lens, as shown, but in practice is a combination of lenses. The optical axis of condenser lens system 22 is superimposed on measuring axis 21. Condenser lens system 22, light source 20 and slit 44 are so disposed, relative to one another, such that slit 44 is fully illuminated.

The object source includes an aperture stop 28 between condenser lens system 22 and slit 44. Aperture stop 28 is disposed in a plane perpendicular to measuring axis 21. Aperture stop 28 is provided with a RIGHT aperture 30 and a LEFT aperture 32. RIGHT aperture 30 and LEFT aperture 32 are diametrically opposed, and symmetrical about measuring axis 21 in the plane of FIG. 1. The center of RIGHT aperture 30 and of LEFT aperture 32 are so disposed from one another that there are defined two converging light beams, 26a and 26b, respectively. Without more, convergent beams 26a and 26b would be superimposed in slit 44.

Further included in the source means between aperture stop 28 and slit 44, is a circular disk or chopper 34. Chopper 34 is mounted to a shaft 36 that is coupled to a means, for example, a motor for rotating chopper 34 at a constant rate, in the direction for example of arrow 38. Chopper 34 is divided into a light transmissive semicircular portion 40 and a light opaque semicircular portion 42. For purposes of explanation, assume the convention, that as chopper 34 rotates, a light is transmitted to slit 44 along convergent beam 26a for the first half of the period of a revolution from RIGHT aperture 30, and for the other half of the period along convergent beam 26b from LEFT aperture 32. Slit 34 thereby, is illuminated sequently by either convergent beam 26a or 27a during rotation of chopper 34. Illuminated slit 44 is the source for optical system 10. It will be apparent that convergent beams 26a and 27a, sequentially, will diverge and be projected as divergent beams to be incident at the outer edge of optical system 10. For example, convergent beam 26a becomes divergent beam 27, which is substantially collimated by optical system 10 to form an emerging collimated beam 60a whos rays are substantially parallel to measuring axis 21.

The object source also includes a reflecting means in back of optical system 10, such that, in essence, collimated beam 60a is reflected along a path back through optical system 10 to be imaged at focal plane 16. There are numerous means for collimated beam 60a to be reflected back to optical system 10. For example, in FIG. 1 a flat mirror 61 is positioned normal to measuring axis 21 to reflect collimated beam 60a back substantially along the incoming path.

For simplicity, FIG. 1 does not show a second convergent beam corresponding to convergent beam 60a that emanates from LEFT aperture 32 as convergent beam 26b. The preceding analysis applies, considering that the second convergent beam is projected from optical system 10 along an axis intersecting measuring axis 21 at focal plane 16 at a positive acute angle.

The apparatus of the present invention further comprises means by intercepting a portion of the light beam which is returned to provide an output indication proportional to the distance along the measuring axis from the test object plane to the focal plane. The returned light beam is sampled at a test image plane. In FIG. 1, the test image plane is located at the test object plane. When the optical system is properly focused, the returned light beam is centered at slit 44 in the test image plane, and light detectors 68 and 70 will detect equal quantities of light. When the optical system is defocused, the returned light beam will be laterally displaced from the center slit 44 of the test image plane, and depending upon the direction of the defocus either light detector 68 or 70 will detect a larger quantity of light. Light detectors 68 and 70 are biased so that they are of opposite polarity. For example, light detector 68 is biased positive and light detector 70 is biased negative. When slit 44 is in a focal plane 16, the image of slit 44 through either path is superimposed on itself. The only light reaching detectors 68 and 70 is spillover due to diffraction. If it is assumed that there is precise balance in slit 44 illumination system, the spillover has the same magnitude of both slit edges, and from both optical paths. With detectors 68 and 70 biased with opposite polarity, the difference output thereof is zero for the focused condition. Thus, the focus sensor of the present apparatus has a null output when the focal plane is in the reference plane.

Consider next, the defocused condition where slit 44 and hence the test object plane is ahead of the original position of focal plane 16. This defocused condition is shown in FIG. 2. In FIG. 2, the test object plane is indicated by numeral 18. For small ranges of defocusing, illuminated slit 44 and its image are equidistant in opposite directions from focal plane 16. That is, the image of illuminated slit 44 is projected by optical system 10 to imaging plane 17; therefore, test object plane 18 and imaging plane 17 are equidistant in opposite directions from focal plane 16. As a consequence of this longitudinal separation between slit 44 and its image, the corresponding lateral image separation causes more light from the RIGHT aperture 28 to fall on the negative biased detector 70 than on the positive biased detector 68. The reverse is true for light from the LEFT aperture 30.

When slit 44 is behind focal plane 16, as in FIG. 3, a similar situation exists except for a reversal in the distribution on the detectors of light from each of the apertures. The detector outputs associated with these defocused conditions indicate the presence, whenver defocusing exits, of a signal at the fundamental chopper frequency, whose magnitude is proportional to the extent of defocusing, and whose phase is uniquely related to the direction of defocusing. This signal can be used either directly or as an input to a servomechanism. Any detector unbalance will produce a signal at twice the fundamental frequency and is easily eliminated by a low pass filter.

With reference to FIG. 4, there is shown a second embodiment of the apparatus of the present invention. In FIG. 4, elements similar to those shown in FIGS. 1 to 3 are similarly numbered. Two improvements are to be noted. The first is the use of a prism to obtain precise optical contiguity of the slit and the detectors. The second difference is the use of penta prisms in place of the flat mirror as the reflector.

Prism 46 is shaped in the form of a wedge having two intersecting planar surfaces. In FIG. 4 the planar surfaces intersect at a dihedral angle of 90 degrees. However, the dihedral angle may be of a different value without departing from the concepts of the invention, in view of the description hereinafter made. The edge of the dihedral angle is perpendicular to the plane of FIG. 4. A plane bisecting the dihedral angle contains measuring axis 21. Prism 46 includes a plannar incident surface 48, opposite the dihedral angle perpendicular to measuring axis 21. The edge of the dihedral angle is optically ground and polished to form a planar edge surface 44a, that is parallel to incident surface 48. Edge surface 44a has a width of the order of a few thousandths of an inch. In effect, edge surface 44a performs as slit 44 is disclosed in FIGS. 1 to 3. The edges of the surfaces of prism 46 describe the boundaries of slit 44a. As in FIGS. 1 to 3, edge surface 44a is illuminated by the condenser lens system 22. Edge surface 44a becomes the object source with respect to lens system 10. Illuminated edge surface 44a is projected to lens system 10. As shown in FIGS. 1 to 3, lens system 10 collimates the projection which emerges from lens system 10 as a collimated beam. However, the projected beam is a divergent beam defined by either RIGHT aperture 30 or LEFT aperture 32. For example, the projection of convergent beam 26a is a divergent beam 27. It is a divergent beam 27 that is collimated by lens system 10 to form an emerging collimated beam 60a whose rays are parallel to measuring axis 21.

In FIG. 4 the autocollimating reflecting means are two pentaprisms, 62 and 64. Convergent beam 26a, during the first half of the period of revolution of chopper 34, after focusing at edge surface 44a, is projected as divergent beam 27 to optical system 10. Divergent beam 27 is collimated by optical system 10 into collimated beam 60a which is incident on face 62a of pentaprism 62. After internal reflection, collimated beam 60a emerges from pentaprism 62 as a collimated beam 60b. Collimated beam 60b, emerging from pentaprism 62, is incident on pentaprism 64. After internal reflection, collimated beam 60b emerges from pentaprism 62 at face 64a, as collimated beam 60c, parallel to, but projected in the opposite direction to that of collimated beam 60a. Collimated beam 60c is incident on optical system 10 and is refracted by optical system 10 into a convergent beam 66. Convergent beam 66 is projected along an axis intercepting measuring axis 21 at a negative acute angle. With edge surface 44a in focal plane 16, and with perfect pentas 62 and 64, the convergent beams projected back from lens system 10 should focus at focal plane 16. Excellent results were obtained where one prism was a regular penta and the other was a penta-roof prism. Other retroreflecting sets of mirror surfaces such as portions of a corner cube could be utilized.

For simplicity, FIG. 4 does not show a second convergent beam corresponding to convergent beam 66 that emanates from LEFT aperture 32 as convergent beam 26b (FIGS. 1 to 3). The preceding analysis applies, considering that the second convergent beam is projected from lens system 10, along an axis intersecting measuring axis 21 at focal plane 16, at a positive acute angle.

In the embodiment of FIG. 4 the intercepting means is comprised further of a means disposed adjacent to the reference plane, to reflect at least a portion of the light bearing the image away from measuring axis 21. The means to reflect a portion of the convergent beam at reference plane 18, is a right reflecting surface 50, produced on one face of the intersecting surface of prism 46. There is a corresponding left reflecting surface 52, produced from the other face of the intersecting surfaces of prism 46. Methods of producing a reflecting surface on a prism are well known in the art and form no part of this invention, and such methods will not be described herein. In cooperation with each reflecting surface, there are a pair of light detectors. There is a light detector 68a, associated with right reflecting surface 50, and a light detector 70a, associated with reflecting surface 52. Light detectors 68a and 70a are biased similar to light detectors 68 and 70 of FIGS. 1 to 3 and are connected to associated electrical circuitry through leads 68b and 70b respectively. The magnitude of the output signal appearing at leads 68b and 70b is a measure of the light energy at the associated reflecting surfaces 50 and 52. By appropriate electrical circuitry, the output signal appearing across leads 68b and 70b is the difference of the individual output signals appearing at leads 68b and at lead 70b. Consequently, the signal polarity appearing across leads 68b and 70b indicates which detector receives the greater light energy. It follows, then, that the output signal polarity indicates the reflecting surface which is the source of the greater light energy.

The intercepting means has associated therewith, a detector 80, for providing a phase reference for comparing light detectors 68 and 70. Detector 80 is disposed so as to have an output signal indicative of the source of light for each half period of revolution of chopper 34. Within the convention adopted herein, that RIGHT aperture 30 is the source for the first half period, detector 80 is disposed to intercept a light from beam 26a immediately after passing through chopper 34. Thus, the output at lead 80a of detector 80 is a signal whose period is related to the period of chopper 34. Let it be assumed, first, as in FIG. 1, that the reference plane is in the focal plane. Then, the convergent beams projected back from lens system 10 will sequentially converge on edge surface 44a. For practical considerations, the light reflected to the detector is spillover due to diffraction at the boundaries of edge surface 44a and reflecting surfaces 50 and 52. The diffraction is manifested as equal and opposite voltages across leads 68 and 70b, and cancel out where the detectors are balanced.

As disclosed with reference to FIGS. 2 and 3, in the defocused condition there is a light distribution on the detectors, indicative of the magnitude of position change between the focal plane and the object plane. Similar to FIG. 2, FIG. 4 shows the defocused condition in which the object plane is in front of the focal plane.

With reference to FIG. 5, there is shown the optical geometry proposed for the defocused condition of FIG. 4. It will be seen that convergent beam 66 strikes edge surface 44a and a portion of reflecting surfaces 50 and 52. A portion of convergent beam 66 that is incident on edge surface 44a, is projected through prism 46 as a beam 66b with limit rays 66b' and 66b'', determined by the junction of reflecting surfaces 50 and 52 and edge surface 44a. The portion of beam 66a striking reflecting surface 50, is reflected as a beam 50a, within limit rays 67a and 67a' to light detector 68a. Similarly, the portion of convergent beam 66a that strikes reflecting surface 52, is reflected as a beam 52a, within limit rays 69a and 69a' to light detector 70a. Based on the convention heretofore adopted, wherein light emanating originally from RIGHT aperture 30 is passed by chopper 34 during the first half of the period, convergent beam 66 will be incident to a greater portion on reflecting surface 50 than on reflecting surface 52. An analysis of the geometry indicates that the distribution of light on each reflecting surface is a measure of the lateral separation of convergent beam 66a from measuring axis 21.

In the first half of the chopper period, with aperture 30 illuminated, the signal appearing at lead 68b is positive and the magnitude $V_{68}$, the signal produced by sensor 68a, is proportional to the light striking reflecting surface 50. In the same half period, the signal appearing at lead 70b is negative, and the magnitude $V_{70}$, the signal produced by sensor 70a is proportional to the light striking reflecting surface 52.

The signal measured across leads 68b and 70b in the first half of the chopper cycle is positive since $V_{68}$ is greater than $V_{70}$. The amplitude of this signal is proportional to the distance between the test object plane 18, containing edge surface 44a, and the imaging plane 17, while the phase of the signal indicates that test object plane 18 is in front of imaging plane 17.

This analysis applies to the second convergent beam, corresponding to convergent beam 66a, except that the sign of the signal in the second half of the period is negative.

Furthermore, this analysis applies to the defocused condition wherein the test object plane is in back of the imagin plane, except that the polarity of this second signal in the first half of the period is negative, and in the second half of the period the polarity of the signal is positive. Thus, the phase of the signal is shifted by $\pi$ radians relative to the first signal. While the output signal appearing across leads 68b and 70b can be used directly to indicate the direction and magnitude of the defocusing, the signal can be used in conjunction with the output of detector 80 to control a servomechanism to restore an image receiving system, such as the film of a camera to the image plane.

Figure 6:
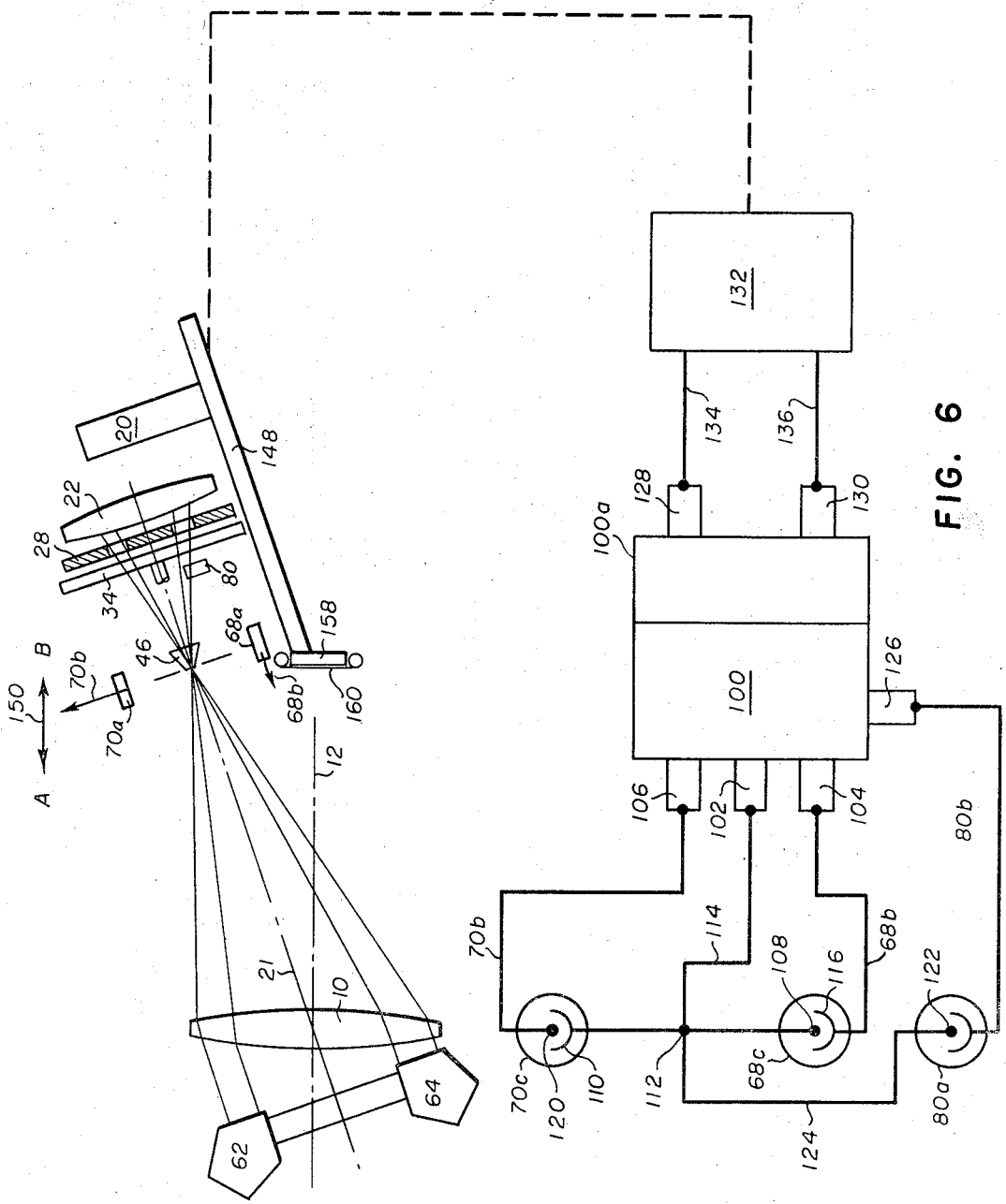

In FIG. 6, there is shown a block schematic diagram of a suggested embodiment of a closed loop servomechanism, whose input is the output of the light detectors and the phase reference detector for restoring a camera system to a null condition and thereby the focused condition.

With reference to FIG. 6, there is shown a closed loop optoservomechanism embodying the focus sensor of the present invention. Optical system 10 is the objective of a camera to image a scene along optical axis 12, on a film 160, supported on a platen 158, fixed to base 148 as shown. Platen 158 with film 160 forms a focused imaging surface for the optical system whereon it is desired for the optical system to produce an image. Measuring axis 21 intercepts optical axis 12 at the principal point of optical system 10, at an angle chosen so as not to interfere with the imaging of the scene of film 160. As previously described, the elements of the focus sensor are disposed along measuring axis 21, on a base 148. Thus are disposed light source 20, condensing lens system 22, aperture plate 28, chopper 34, prism 46, light detectors 68 and 70 with leads 68b and 70b and pentaprisms 62 and 64.

The source of the focus condition information is the output of light detectors 68a and 70a and detector 80. In FIG. 6, light detectors 68a and 70a are idealized as a pair of balanced photocells 68c and 70c. The cathode 108 of photocell 68c is coupled to the plate 110 of photocell 70c at a common junction 112. The outputs of the anodes 116 and the cathode 120 of photocells 68c and 70c, respectively, are at leads 68b and 70b, respectively.

Detector 80 is idealized as a photocell 80a, with the cathode 122 coupled to common junction 112 by lead 124. The output of the anode 126 is at lead 80a.

The circuit further includes a phase sensitive detector 100, having a common terminal 102, a pair of input terminals 104 and 106, a phase input terminal 126 and a pair of output terminals 128 and 130.

Common junction 112 is coupled by a lead 114 to common terminal 102. Lead 68b is coupled to input terminal 104 and lead 70b is coupled to input terminal 106. Lead 80b is coupled to phase input terminal 126.

The output signal across output terminals 128 and 130 of circuit 100 is a direct current signal, whose amplitude indicates the amount of the aforesaid displacement and whose polarity indicates its direction. Circuit 100 could take many forms as is well known to those skilled in the art. For example, circuit 100 could comprise a synchronous rectifier connected to a low pass filter 100a, for integrating the output of the rectifier while filtering out any second harmonics indicative of detector unbalance, as previously set forth.

The amplitude of the signal is proportional to the magnitude of defocusing. That is, the amplitude is related to the signal appearing across leads 68b and 70b. Therefore, the amplitude is a measure of the distance of the test object plane to the imaging plane. The phase reference signal appearing at phase input terminal 126 controls the synchronous rectifier and provides a potential sign of the direct current signal, so that a time base is related to the position of the test object plane relative to the imaging plane. For example, if the test object plane is in front of the imaging plane, as shown in FIG. 2, the potential of the DC signal is negative, whereas if the situation is reversed, the potential of the DC signal is positive.

Output terminals 128 and 130 are coupled to a servomechanism means 132, by leads 134 and 136, while servomechanism means 132 mechanically drives base 148 and film platen 156 parallel to axis 12, as indicated by arrow 150.

Thus, if the output signal has a positive polarity, this indicates that the test object plane is in front of the focal plane. Therefore, the servomechanism will move base 148 and platen 156 attached thereto in direction B of arrow 150 until the null condition is achieved and film 160 is in the focal plane and the plane of best focus for optical system 10.

While there have been described what are at present considered to be the preferred embodiments of this invention, it will be obvious to those skilled in the art that various changes and modifications may be made therein without departing from the invention. It is, therefore, aimed in the appending claims to cover all such changes and modifications as fall within the true spirit and scope of the invention.

What is claimed is:

1. Apparatus comprising:
   (a) an optical system having a plane of best focus;

(b) an imaging surface located near and parallel to the plane of best focus;

(c) projection means, located at a test object plane near the plane of best focus, for projecting at least one light beam along a path through said optical system;

(d) means, including a reflecting means, for directing said at least one light beam back through said optical system to a central point in a test image plane when the imaging surface is located coincident to the plane of best focus, and for laterally displacing said at least one light beam from said central point when the imaging surface is not coincident to the plane of best focus; and (e) sensing means for sensing the lateral displacement of said at least one light beam from said central point in the test image plane, and for providing an output signal indicative thereof.

2. Apparatus as set forth in claim 1 wherein said plane of best focus is located at the focal plane of the optical system.

3. Apparatus as set forth in claim 2 wherein said sensing means includes two radiation detectors, one radiation detector being positioned to detect a lateral displacement of each light beam in a first direction from said central point in the test image plane, and the second detector being positioned to detect a lateral displacement in a second direction, opposite said first direction, of each light beam from said central point in the test image plane.

4. Apparatus as set forth in claim 3 wherein:
(a) said projection means includes a slit prism having the surface of the prism formed by the slit in the test object plane, and means to direct at least one light beam through said surface along a path through said optical system; and
(b) said sensing means utilizes two opposite sides of said prism to reflect each laterally displaced light beam to said first and second radiation detectors.

5. Apparatus as set forth in claim 4 wherein said projection means projects two separate light beams at said optical system.

6. Apparatus as set forth in claim 5 wherein each of said light beams is projected at a frequency of F cycles per second, and means are provided, responsive to said output signal from the sensing means, for deriving a modified output signal by rejecting signals having a frequency of 2F.

7. Apparatus as set forth in claim 1 wherein said projection means projects two separate light beams at said optical system.

8. Apparatus as set forth in claim 7 wherein each of said light beams is projected at a frequency of F cycles per second, and means are provided, responsive to said output signal from the sensing means, for deriving a modified output signal by rejecting signals having a frequency of 2F.

9. Apparatus as set forth in claim 1 wherein means are provided, responsive to the output signal from said sensing means, for moving said imaging surface to the plane of best focus.

10. Apparatus as set forth in claim 9 wherein said plane of best focus is located at the focal plane of the optical system.

11. Apparatus as set forth in claim 10 wherein said sensing means includes two radiation detectors, one radiation detector being positioned to detect a lateral displacement of each light beam in a first direction from said central point in the test image plane, and the second detector being positioned to detect a lateral displacement in a second direction, opposite said first direction, of each light beam from said central point in the test image plane.

12. Apparatus as set forth in claim 11 wherein:
(a) said projection means includes a slit prism having the surface of the prism formed by the slit in the test object plane, and means to project at least one light beam through said surface along a path through said optical system; and
(b) said sensing means utilizes two opposite sides of said prism to reflect each laterally displaced light beam to said first and second radiation detectors.

13. Apparatus as set forth in claim 9 wherein said projection means projects two separate light beams at said optical system.

14. Apparatus as set forth in claim 13 wherein each of said light beams is projected at a frequency of F cycles per second and means are provided, responsive to said output signal from the sensing means, for deriving a modified output signal by rejecting signals having a frequency of 2F, and said moving means is responsive to said modified output signal.

References Cited

UNITED STATES PATENTS

| | | | |
|---|---|---|---|
| 2,968,994 | 1/1961 | Shurcliff | 356—122X |
| 3,283,120 | 11/1966 | Spruck. | |

RONALD L. WIBERT, Primary Examiner

P. K. GODWIN, Assistant Examiner

U.S. Cl. X.R.

250—220; 356—122, 123, 172